United States Patent [19]
Oddenino

[11] Patent Number: 4,648,735
[45] Date of Patent: Mar. 10, 1987

[54] DEVICE FOR CONNECTING AN UPHOLSTERY STRENGTHENING ROD TO A SEAT LOAD-BEARING STRUCTURE

[75] Inventor: Manrico Oddenino, Buttigliera Alta, Italy

[73] Assignee: ITW Fastex Italia S.p.A., Turin, Italy

[21] Appl. No.: 715,232

[22] Filed: Mar. 22, 1985

[30] Foreign Application Priority Data

Apr. 2, 1984 [IT] Italy .............................. 67319 A/84

[51] Int. Cl.⁴ ............................ F16B 7/00; F16B 9/00
[52] U.S. Cl. .................................. 403/187; 403/233; 403/235; 24/16 PB; 24/335; 248/74.3
[58] Field of Search ............... 403/233, 235, 191, 187, 403/24; 248/74.3, 71; 24/16 R, 16 PB, 335

[56] References Cited

U.S. PATENT DOCUMENTS

| | | | |
|---|---|---|---|
| 3,193,796 | 7/1965 | Spangler | 403/191 X |
| 3,463,427 | 8/1969 | Fisher | 24/16 PB |
| 3,568,262 | 3/1971 | Woldman | 24/16 PB |
| 3,653,096 | 4/1972 | Fernberg | 24/16 PB X |
| 3,913,187 | 10/1975 | Okuda | 248/74.3 X |
| 4,059,300 | 11/1977 | Moberg et al. | 24/16 PB X |
| 4,342,438 | 8/1982 | Speedie | 24/16 PB X |
| 4,371,137 | 2/1983 | Anscher | 24/16 PB X |

FOREIGN PATENT DOCUMENTS

| | | | |
|---|---|---|---|
| 2018648 | 8/1971 | Fed. Rep. of Germany | 403/233 |
| 692387 | 2/1961 | Italy | 248/74.3 |

Primary Examiner—Richard J. Scanlan, Jr.
Assistant Examiner—Todd G. Williams
Attorney, Agent, or Firm—A. J. Brunett; T. W. Buckman

[57] ABSTRACT

A device for connecting the strengthening rod on seat upholstery to the seat load-bearing structure. The device is composed of a fastener into which is engaged a corresponding end of the strengthening rod, a buckle, integral with the fastener and secured to the same by means of a flexible rib enabling angular displacement of the fastener, and a flexible clamp designed to wrap round a member on the load-bearing structure for securing the fastener in projecting manner to the member, and integrally formed at its opposite ends to the buckle and a stop tab designed to engage with the buckle.

9 Claims, 3 Drawing Figures

DEVICE FOR CONNECTING AN UPHOLSTERY STRENGTHENING ROD TO A SEAT LOAD-BEARING STRUCTURE

BACKGROUND OF THE INVENTION

The present invention relates to a device for connecting an upholstery strengthening rod to a seat load-boarding structure, in particular, a vehicle seat. Here and in the following description, the term "upholstery strengthening rod" is used to indicate a rod, usually consisting of a drawn metal rod, engaged, e.g. sewn or fitted, on the inner side of the upholstery on the rear of the seatback, inside a sleeve formed from the sheet material used for the upholstery. This rod is designed to fit at either end into respective seats formed on the seat load-bearing structure, so as to secure the upholstery to the load-bearing structure and stretch the upholstery in relation to padding placed between the upholstery and the load-bearing structure. Those skilled in the art and specialists in vehicle seats will however, already be familiar with the term.

Securing an upholstery strengthening rod to the load-bearing structure on a vehicle seat is known to be a lengthy, painstaking job. Normally the fitter must first fit part of the upholstery on to the seatback, so as to bring the strengthening rod up to the connecting seats formed beforehand on the load-bearing structure. Then, keeping the rest of the upholstery rolled up, he must insert the opposite ends of the strengthening rod into their respective seats and then finish fitting the upholstery on to the rest of the seat. As the ends of the strengthening rod are slid into their respective seats, i.e. by first inserting the ends into relatively large apertures formed close to the seats into which the ends of the strengthening rod are then slid, clearly, during the final upholstering stage, the strengthening rod may slip out of its seat, thus making it necessary for the fitter to repeat the upholstering and fitting operation all over again. Furthermore, actual insertion of the strengthening rod is made awkward since visibility is impaired by the rolled-up upholstery and due to the fact that the fitter may be forced to pull on the upholstery for fitting the strengthening rod inside its connecting seats.

SUMMARY OF THE INVENTION

The aim of the present invention is to provide a connecting device that can be fitted quickly and easily on to a seat loadbearing structure before the latter is upholstered, and to which the upholstery strengthening rod may simply be pressed on, after upholstering the seat, in such a manner as to secure the strengthening rod and upholstery easily, quickly and safely on to the load-bearing structure. A further aim of the present invention is to provide a device of the aforementioned type that is both easy and inexpensive to produce and which enables the strengthening rod to be assembled on to a load-bearing structure which may have manufacturing defects in dimension and/or shape.

With these aims in view, the present invention relates to a device for connecting an upholstery strengthening rod to a seat loadbearing structure, in particular, a vehicle seat, characterised by the fact that it comprises a fastener, having a seat for housing one end of the strengthening rod and retaining means for engaging and locking the end of the strengthening rod inside the seat, a buckle integral with the fastener, a flexible clamp comprising a first end, secured integral with the buckle, and a second end opposite the first having a stop tab designed to click into and engage with the buckle for securing the latter to the second end of the clamp, the clamp being designed to wrap round a member on the load-bearing structure and comprising stop means for securing the fastener to the member on the load-bearing structure.

BRIEF DESCRIPTION OF THE DRAWINGS

A non-limiting arrangement of the present invention will now be described with reference to the attached drawings in which.

DETAILED DESCRIPTION OF THE INVENTION

Figure 1:
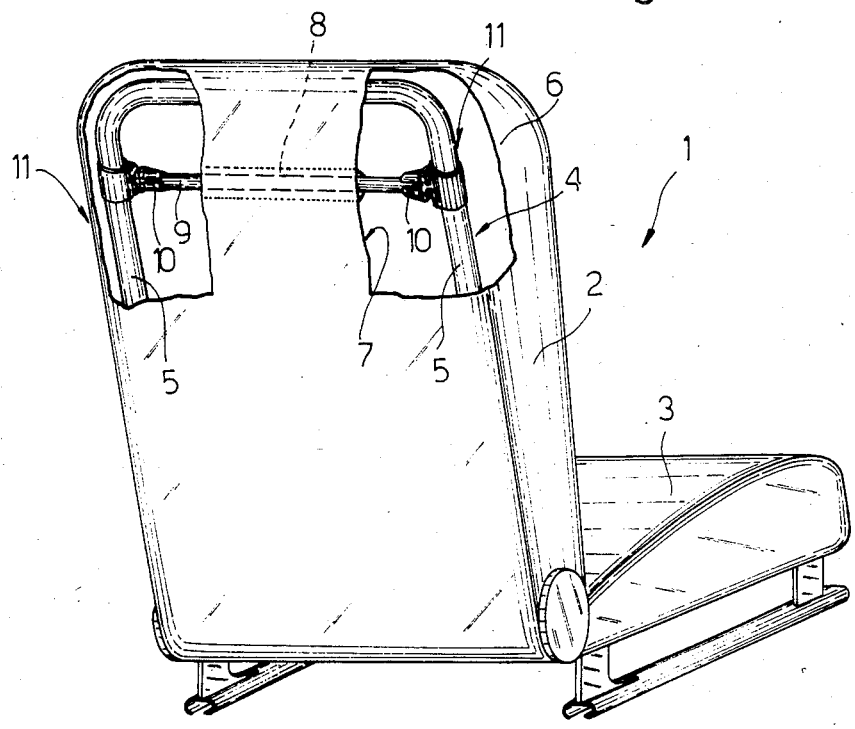
FIG. 1 shows a partially sectioned view in perspective of a seat fitted with the device according to the present invention.

Number 1 in FIG. 1 indicates any known type of seat, in particular a vehicle seat, e.g. on a car (not shown for simplicity). The seat is formed of a seatback 2 and base 3 and comprises a load-bearing structure 4, preferably formed from tubular elements 5 connected in any convenient manner and designed to impart shape and strength to seatback 2 and base 3. Additionally, any known type of padding (not shown for simplicity), and upholstery 6 formed from sheet material such as cloth, plastic or leather for covering load-bearing structure 4 and the padding (not shown) may be employed. Upholstery 6 presents a rear inner surface 7 designed to cover the rear of seatback 2 and having a crosswise sleeve 8 made in any known manner, e.g. by sewing a portion of sheet material of appropriate shape and size on to surface 7. The sleeve 8 houses a known type of upholstery strengthening rod 9 secured at its ends 10 to members 5 on load-bearing structure 4 defining the sides of seatback 2. The strengthening rod 9 is designed to secure upholstery 6 to load-bearing structure 4 and to stretch the upholstery over the padding (not shown). Seat 1 differs from known seats with similar load-bearing structures in that strengthening rod 9 is not directly secured to members 5 on loadbearing structure 4 but is secured via a pair of connecting devices 11 fitted integrally with members 5 on load-bearing structure 4 which support the ends 10 of strengthening rod 9 projecting from opposite ends of sleeve 8.

Figure 2:
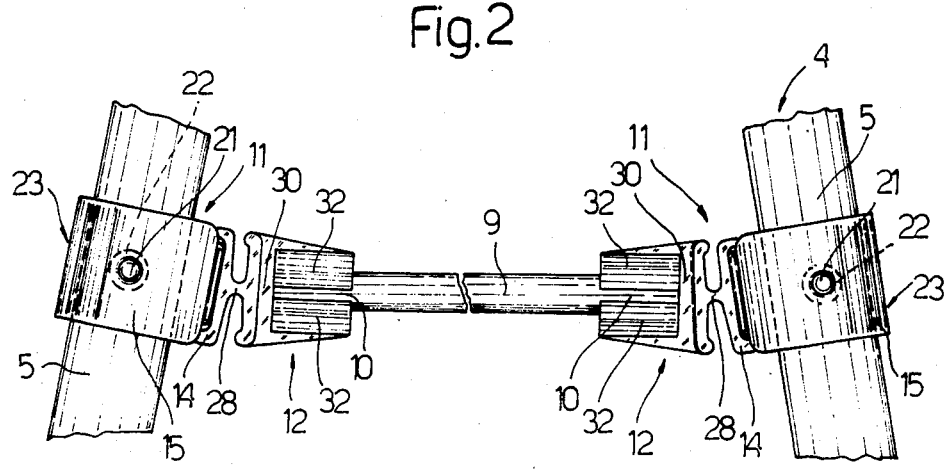
FIG. 2 shows a larger-scale detail of the FIG. 1 seat.
Figure 3:
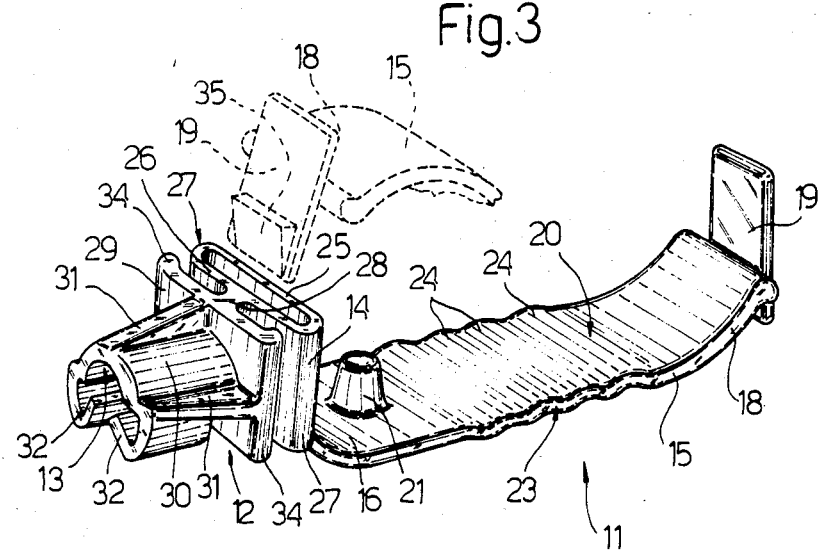
FIG. 3 shows the device according to the present invention as it appears prior to assembly on the seat.

As shown in FIGS. 2 and 3, each connecting device 11 comprises a fastener or head 12 with a seat 13 for housing the corresponding ends 10 of strengthening rod 9. This fastener also includes retaining means for clicking, engaging and locking ends 10 of strengthening rod 9 inside the seat 13 as well as a buckle 14 integral with fastener 12 and a flexible clamp 15 projecting from and integral with buckle 14. The clamp 15 is comprised of an end 16, and an end 18 opposite end 16 is slightly curved with an integral stop tab 19 designed to click and engage into buckle 14 for securing end 18 to buckle 14 on the opposite side of buckle 14 which end 16 is secured. According to the present invention, the members 12, 14 and 15 are integrally formed with one another so as to form one uninterrupted piece and are made of any known type of synthetic plastic resin providing for a minimum of flexibility. Clamp 15 is designed to wrap inner surface 20 round one of the members 5 on load-bearing structure 4 and, according to the present invention, also comprises stop means for securing itself and fastener 12, to the corresponding member 5 round which it is wrapped. In more detail, according to the preferred arrangement shown, surface 20 is designed to cooperate by direct contact with the member 5 round which clamp 15 is wrapped and is provided on its end 16 with an essentially truncated-cone pin 21. This pin 21 is formed integrally with clamp 15 and projects from surface 20 perpendicular to the latter and lies in the same plane in which clamp 15 lies. Pin 21 is designed to engage a corresponding hole 22 (FIG. 2) blanked and/or punched on to the corresponding member 5 round which clamp 15 is wrapped. The clamp 15 also comprises an undulated, deformable centre portion 23 joining opposite ends 16 and 18. The end 16 is essentially flat and the end 18 is essentially curved, and is designed to enable clamp 15 to be wrapped round the corresponding member 5, as shown in FIG. 2, even if the member 5, instead of being perfectly cylindrical, is crushed or distorted as a result of manufacturing defects which may occur particularly when forming holes 22. Portion 23 preferably comprises four or five undulations 24 which, in view of the deformable nature of clamp 15, may obviously bend so as to modify their bend radius and so enable clamp 15 to change in length by a small but sufficient amount to enable it to be wrapped fully round respective member 5 whatever shape the latter may be.

According to the present invention, buckle 14, on to which clamp 15 locks, and fastener 12 are hingedly connected so as to enable limited angular displacement of fastener 12 in relation to buckle 14. This permits the employment of identical connecting devices 11 on both members 5 on load-bearing structure 4, even when the members 5, instead of being perfectly parallel, converge slightly upwards, as shown in FIG. 2. In more detail, according to the arrangement shown, buckle 14 consists of an essentially parallelepiped sleeve, open at each end and defined by opposite essentially flat parallel walls 25 and 26 and side walls 27. Buckle 14 is connected to fastener 12 by means of a flexible rib 28 parallel with the axis of sleeve or buckle 14, and is made in one piece with wall 26 and extends perpendicular to an essentially flat face on sleeve 14 facing the opposite way to clamp 15 and defined by wall 26 itself. Fastener 12, on the other hand, comprises a base 29, connected integrally with flexible rib 28 and is arranged parallel with and faces the flat on sleeve or buckle 14 defined by wall 26. The base 29 has a semicircular projection 30 projecting perpendicular to base 29, having strengthening ribs 31 and defining internally the seat 13 for housing one of the ends 10 on strengthening rod 9. Projection 30 is also provided with a pair of essentially V-shaped flexible tabs 32 arranged in front of seat 13 so as to define with the latter the retaining means for locking end 10 of strengthening rod 9 inside seat 13. Tabs 32 are formed integrally with and project from opposite sides of projection 30, next to side ribs 31, and are designed to bend outwards so as to enale end 10 to be clicked and engaged into seat 13. Base 29 presents opposite rounded side edges 34 designed to cooperate with buckle 14, following flexure of rib 28, so as to act as limit stops for limiting angular movement of fastener 12 in relation to buckle 14. The buckle 14 and stop tab 19 on clamp 15 are arranged parallel to each other on ends 16 and 18 of the said clamp 15 respectively, and extend perpendicular to surface 20 so as to form an essentially 90° angle in relation to clamp 15, and project from clamp 15 on the side of surface 20 and, therefore, also of pin 21. As shown by the dotted lines in FIG. 3, tab 19 is designed to fit inside the sleeve forming buckle 14, subsequent to folding clamp 15 by 180, and is designed to lock inside the sleeve by means of a dog 35 designed to engage, for example, with a ridge (not shown) on the inside of sleeve or buckle 14 formed integrally, for example, with wall 26.

Operation of the device according to the present invention will be clear from the foregoing description. Fitting strengthening rod 9 on to seat 1 simply requires two connecting devices 11 according to the present invention. These devices 11 are arranged symmetrically opposite each other by first inserting pin 21 on each device 11 into the corresponding hole 22 on member 5 of load-bearing structure 4, and then locking clamp 15 round the member 5 by folding the said clamp 15 so as to click tab 19 inside buckle 14. In like manner, the two connecting devices 11 are firmly fitted to load-bearing structure 4 with fasteners 12 projecting towards each other from members 5 and seats 13 facing surface 7 on upholstery 6 which may thus be safely fitted on to seat 1 without taking into account assembly of strengthening rod 9. Once upholstery 6 has been fitted, all the fitter needs to do is to locate strengthening rod 9, by sliding his hands over upholstery 6, and simply push the rod 9 into seats 13 by pushing it towards seatback 7. As ends 10 are located exactly facing seats 13, pressing on strengthening rod 9 causes the ends to bend tabs 32 and to lock, with no danger of accidental withdrawal, inside the seats 13. To insure the latter and ends 10 are arranged facing, once seat 1 has been upholstered, clearly, holes 22 need simply be formed at such a height as to secure devices 11 according to the present invention in the same position to be occupied by strengthening rod 9. The advantages of the connecting device according to the present invention and of the seat employing such a device for connecting the upholstery strengthening rod to the seat load-bearing structure will be clear from the foregoing description. Without making any changes to existing and currently used seat load-bearing structures, except for forming holes 22 at an appropriate height on the same, the present invention provides for considerably simplifying and speeding up assembly of the seats, thus enabling reduced cost and increased output. The connection provided for by the present invention is also safer and more reliable than that obtainable using other known means. Furthermore, the connecting device according to the present invention is extremely cheap and easy to make and may be fitted easily and quickly on to the seat load-bearing structure, at the same time compensating for any defects in size or shape on the members to which it is fitted. Finally, the flexible joint between the buckle, locking the clamp on the device to the load-bearing structure, and the fastener into which the strengthening rod is clicked enables two identical connecting devices to be employed on opposite side members of the load-bearing structure, even if the latter are not parallel. The flexure of ribs 28 ensures strengthening rod 9 is essentially horizontal at all times, regardless of the shape of load-bearing structure 4.

To those skilled in the art is will be clear that changes can be made to the connecting device described herein without, however, departing from the scope of the present invention, and that the latter also covers all types of seats produced using the connecting device according to the present invention and of which the device forms an essential part.

I claim:

1. A fastening device for connecting a rod to a structural member comprising:

retaining means for engaging, seating and locking an end of said rod;

buckle means integral with said retaining means on one side thereof;

flexible clamp means for affixing said device to said structural member having a first end integral with said buckle means and a second end having an integrally formed tab for engagement with said buckle means; and means for engaging integral with said flexible clamp means for securing said fastening device to said structural member having a truncated cone pin integrally formed with said clamp means projecting outwardly from one side thereof for insertion into an aperture of said structural member upon the wrapping of said clamp means around said structural member to secure said fastening device thereto.

2. The device of claim 1, wherein said pin is proximate said first end of said clamping means.

3. The device of claim 1, wherein said retaining means, buckle means and clamp means are integrally formed to one another to form a single piece and are formed of a synthetic plastic resin.

4. The device of claim 1, wherein said flexible clamp means further comprises a deformable undulated center portion intermediate said first and second ends to enable said clamp to be looped around said structural member even if said member is not perfectly cylindrical.

5. The device of claim 1, wherein said retaining means and said buckle means are connected by a flexible rib which enables angular movement of said retaining means in relation to said buckle means and said clamp means.

6. The device of claim 5, wherein said buckle means is comprised of an essentially parallelepiped sleeve open at each end and wherein said rib is arranged parallel to the axis of said sleeve and extends perpendicular to an essentially flat face on said sleeve on its side opposite said flexible clamp means.

7. The device of claim 6, wherein said retaining means further comprises a base integrally connected to said flexible rib and arranged parallel to and facing said flat face on said sleeve forming said buckle means and a semicircular projection perpendicular to said base and defining a seat for said rod end, said base further comprising limit stops designed to cooperate with said buckle means for limiting angular movement of said retaining means in relation to said buckle means, said semicircular projection having a pair of flexible V-shaped tabs in front of said seat for locking said rod end.

8. The device of claim 1, wherein said buckle means and said tab are arranged parallel to each other at opposite ends of said flexible clamp means and form a 90° angle with and project from the same side of the inner surface of said clamp means.

9. A vehicle seat according to claim 1, wherein said structural member has an aperture on each of its respective sides, two of said fastening devices secured to said structural member in said apertures and a rod engaged into said devices.

* * * * *